(12) United States Patent
Kwon et al.

(10) Patent No.: US 8,310,994 B2
(45) Date of Patent: Nov. 13, 2012

(54) METHOD FOR CONFIGURING AND MANAGING CHANNELS IN A WIRELESS COMMUNICATION SYSTEM USING AMC CHANNELS AND DIVERSITY CHANNELS, TRANSMISSION/RECEPTION APPARATUS THEREOF, AND SYSTEM THEREOF

(75) Inventors: Hwan-Joon Kwon, Hwaseong-si (KR); Dong-Hee Kim, Yongin-si (KR); Jin-Kyu Han, Suwon-si (KR); Joon-Young Cho, Suwon-si (KR); Yun-Ok Cho, Suwon-si (KR); Ju-Ho Lee, Suwon-si (KR)

(73) Assignee: QUALCOMM Incorporated, San Diego, CA (US)

( * ) Notice: Subject to any disclaimer, the term of this patent is extended or adjusted under 35 U.S.C. 154(b) by 1344 days.

(21) Appl. No.: 11/417,221

(22) Filed: May 4, 2006

(65) Prior Publication Data
US 2006/0268983 A1    Nov. 30, 2006

(30) Foreign Application Priority Data
May 4, 2005    (KR) .......................... 10-2005-0037779

(51) Int. Cl.
*H04W 4/00*    (2009.01)
(52) U.S. Cl. ........ 370/329; 370/252; 370/341; 370/206; 375/240; 375/260
(58) Field of Classification Search .................. 370/252, 370/329, 341, 206; 375/260, 240
See application file for complete search history.

(56) References Cited

U.S. PATENT DOCUMENTS

| | | | |
|---|---|---|---|
| 2003/0123559 A1* | 7/2003 | Classon et al. | 375/260 |
| 2003/0169681 A1 | 9/2003 | Li et al. | |
| 2004/0092281 A1* | 5/2004 | Burchfiel | 455/522 |
| 2004/0120411 A1 | 6/2004 | Walton et al. | |
| 2004/0179557 A1* | 9/2004 | Tong et al. | 370/537 |
| 2005/0025039 A1* | 2/2005 | Hwang et al. | 370/206 |
| 2005/0157638 A1* | 7/2005 | Maltsev et al. | 370/203 |
| 2005/0180315 A1* | 8/2005 | Chitrapu et al. | 370/208 |
| 2005/0201309 A1* | 9/2005 | Kang et al. | 370/310 |
| 2005/0201327 A1* | 9/2005 | Kim et al. | 370/329 |
| 2005/0233754 A1* | 10/2005 | Beale | 455/452.2 |

FOREIGN PATENT DOCUMENTS

| | | |
|---|---|---|
| EP | 1612980 | 1/2006 |
| EP | 1646170 | 4/2006 |
| RU | 2192094 | 10/2002 |
| WO | WO 01/91356 A1 | 11/2001 |
| WO | WO 02/49306 A2 | 6/2002 |

OTHER PUBLICATIONS

Office Action from related Japanese Application No. 2008-509941, dated Feb. 9, 2010.
EP Search Report from related EP Application No. 06732905.2, dated Jul. 12, 2010.

* cited by examiner

*Primary Examiner* — David Oveissi
(74) *Attorney, Agent, or Firm* — Xue Ming Jimmy Cheng (57) ABSTRACT

Provided is a method for configuring and managing a channel in a wireless communication system that divides a full frequency band into a plurality of sub-bands. The method comprises selecting at least one sub-band from the plurality of sub-bands and allocating each of a plurality of Adaptive Modulation and Coding (AMC) channels using the selected at least one sub-band; puncturing sub-carriers of at least one of the plurality of AMC channels according to a predetermined pattern; and allocating a diversity channel using the punctured sub-carriers.

26 Claims, 11 Drawing Sheets

METHOD FOR CONFIGURING AND MANAGING CHANNELS IN A WIRELESS COMMUNICATION SYSTEM USING AMC CHANNELS AND DIVERSITY CHANNELS, TRANSMISSION/RECEPTION APPARATUS THEREOF, AND SYSTEM THEREOF

CROSS-REFERENCE TO RELATED APPLICATION

This application claims the benefit under 35 U.S.C. §119(a) of Korean Patent Application No. 2005-37779, filed May 4, 2005, in the Korean Intellectual Property Office, the entire disclosure of which is hereby incorporated by reference.

BACKGROUND OF THE INVENTION

1. Field of the Invention

The present invention relates generally to a method and system for configuring and managing channels in a wireless communication system using a multiple access scheme. More particularly, the present invention relates to a method for allocating resources and transmitting data with the allocated resources in a communication system using Orthogonal Frequency Division Multiplexing (OFDM), and a system for managing the same.

2. Description of the Related Art

For mobile communication systems, active research is being conducted on using the OFDM scheme for high-speed data transmission over wired/wireless channels. The OFDM scheme, a technique for transmitting data using multiple carriers, is a type of Multi-Carrier Modulation (MCM) that converts a serial input symbol stream into parallel symbols and modulates each of the symbols with a plurality of orthogonal sub-carriers before transmission.

MCM was first used in military high-fidelity (HF) radios in the late 1950s, and the OFDM scheme began to develop in the 1970s. However, there were limitations in the application of MCM and OFDM schemes to a communications system because of the difficulty in implementing orthogonal modulation between multiple carriers. After Weinstein, et al. showed in 1971 that OFDM modulation/demodulation can be efficiently achieved using Discrete Fourier Transform (DFT), the development of the OFDM technology rapidly progressed. In addition, the recent introduction of a method of using a guard interval and inserting a cyclic prefix (CP) in the guard interval has reduced the multi-path delay spread effects.

The OFDM scheme is increasingly applied to digital transmission technologies, examples of which include Digital Audio Broadcasting (DAB), Digital Television, Wireless Local Area Network (WLAN), Wireless Asynchronous Transfer Mode (WATM). The realization of the OFDM scheme is made possible by recent developments of various digital signal processing technologies, including Fast Fourier Transform (FFT) and Inverse Fast Fourier Transform (IFFT) which were not previously commonly used due to their high degree of hardware complexity. The OFDM scheme, while similar to conventional Frequency Division Multiplexing (FDM), is characterized by maintaining orthogonality between multiple sub-carriers during transmission, thereby obtaining the optimal transmission efficiency during high-speed data transmission.

In addition, the OFDM scheme can obtain the optimal transmission efficiency during high-speed data transmission because it is robust against multi-path fading. Further, the OFDM scheme, since it overlaps frequency spectra, has high frequency efficiency and is robust against frequency selective fading and multi-path fading. Moreover, the OFDM scheme can reduce inter-symbol interference (ISI) with the use of the guard interval. In addition an equalizer of low hardware complexity can be designed for use with the OFDM scheme. Also the OFDM scheme is robust against impulse noises. Because of the above benefits the OFDM scheme is being actively applied to communication systems.

In wireless communications, deterioration of high-speed, high-quality data service is generally caused by the channel environment. For wireless communications, the channel environment is subject to frequent change due not only to Additive White Gaussian Noise (AWGN), but also to power variations of received signals caused by fading, shadowing, a Doppler effect caused by movement and frequent velocity change of the terminals, and interference caused by signals from other users and multi-path signals. Therefore, in order to support high-speed, high-quality data service, wireless communication systems need to efficiently overcome the foregoing disadvantageous factors.

In the conventional OFDM system, the transmission technologies used for coping with the fading can be roughly classified into two kinds: one is Adaptive Modulation and Coding (AMC) technology and the other is Diversity technology.

First, the AMC technology will be described.

The AMC technology adaptively controls a modulation scheme and a coding scheme according to channel variation of a downlink. Generally, Channel Quality Information (CQI) of the downlink can be detected by a terminal by measuring a Signal-to-Noise Ratio (SNR) of a received signal. That is, the terminal feedback-transmits the CQI of the downlink to a base station over an uplink. The base station estimates a channel state of the downlink depending on the CQI of the downlink fed back from the terminal. The base station controls its modulation scheme and coding scheme according to the estimated channel state.

The AMC technology generally uses high-order modulation and a high coding rate for a good channel state, and low-order modulation and a low coding rate for a bad channel state. The AMC scheme, compared with the conventional scheme based on high-speed power control, increases application capability for time-variable characteristics of the channel, thereby improving average system performance.

Figure 1:
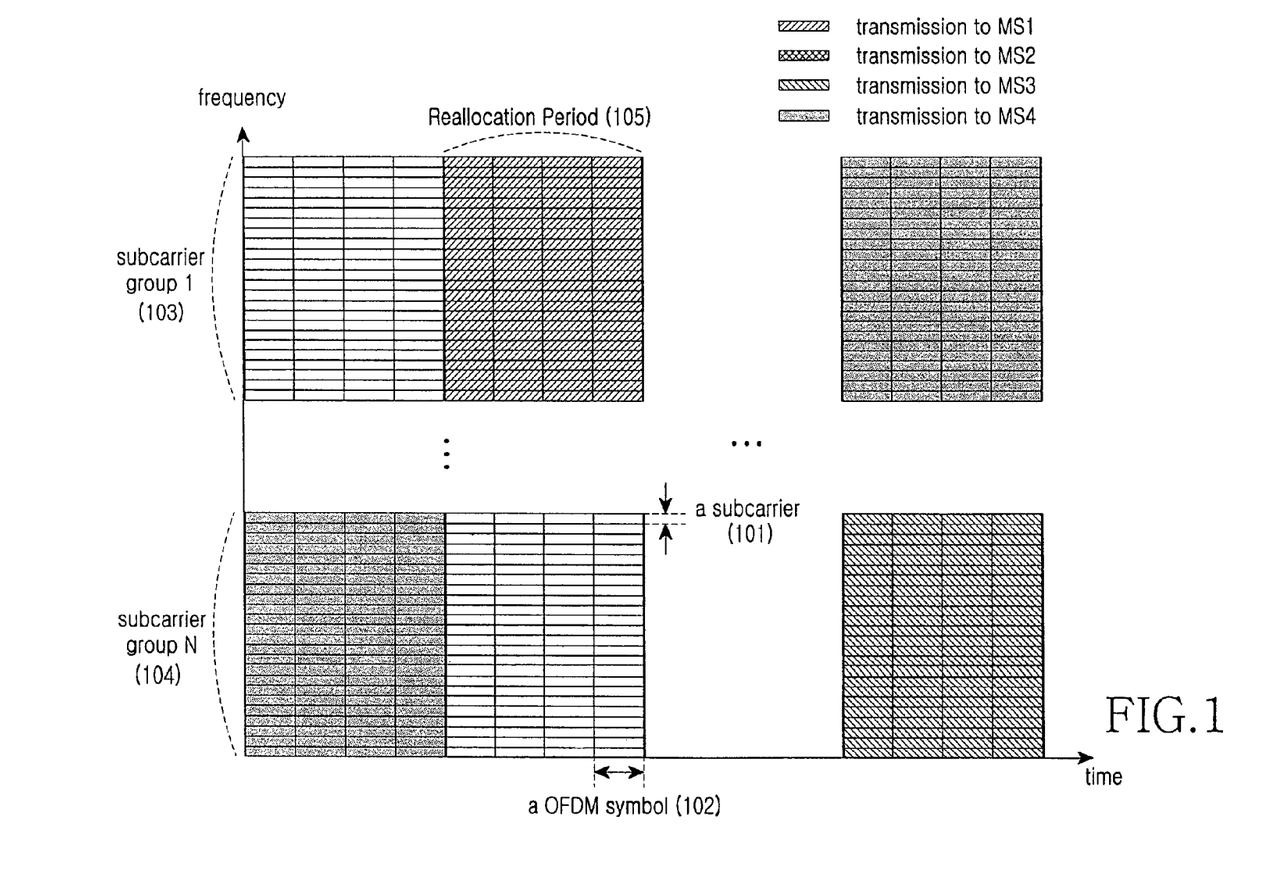
FIG. 1 is a diagram illustrating an exemplary AMC operation in a conventional OFDM system.

FIG. 1 is a diagram illustrating an exemplary AMC operation in a conventional OFDM system.

Referring to FIG. 1, reference numeral 101 denotes one sub-carrier, and reference numeral 102 denotes one OFDM symbol. In FIG. 1, the horizontal axis represents a time axis, and the vertical axis represents a frequency axis. As illustrated in FIG. 1, an OFDM system using the AMC technology generally divides the full frequency band into N sub-carrier groups #1 to #N, and performs an AMC operation per sub-carrier group. Herein, one sub-carrier group will be referred to as "one AMC sub-band." That is, a sub-carrier group #1 denoted by reference numeral 103 is referred to as an "AMC sub-band #1," and a sub-carrier group #N denoted by reference numeral 104 is referred to as an "AMC sub-band #N." In the conventional OFDM system, scheduling is performed in units of a plurality of OFDM symbols as denoted by reference numeral 105.

As described above, the AMC operation in the conventional OFDM system is independently performed per AMC sub-band. Each terminal feeds CQI information for each individual sub-band back to a base station, and the base station performs scheduling on each sub-band depending on the CQI information for each sub-band received from the terminals and transmits user data per sub-band. In the exemplary scheduling process, the base station selects a terminal having the best channel quality for each individual sub-band, and transmits data to the selected terminal, thereby maximizing the system capacity.

In the AMC technology, it is preferable that multiple sub-carriers necessary for transmitting data for one terminal are adjacent to each other. This is because when frequency selectivity occurs in a frequency domain due to the multi-path wireless channel, the adjacent sub-carriers are similar to each other in strength of the channel response, but the sub-carriers spaced apart from each other may be greatly different in the strength of the channel response. That is, because the AMC operation maximizes the system capacity by gathering sub-carriers with a good channel response and transmitting data through them, there is a need for a structure capable of gathering a plurality of adjacent sub-carriers with a good channel response and transmitting data using the gathered sub-carriers.

The AMC technology is suitable for communications traffic transmitted to a particular user. This is because it is not preferable that the channel transmitted to a plurality of users, for example, the broadcast channel or the common control information channel, is adapted to the channel state of a certain user. In addition, the AMC technology is appropriate for transmission of communications traffic which is less susceptible to delay. This is because the AMC technology basically selects the terminals in a good channel state and then transmits data to only the selected terminals, so for delay-sensitive communications traffic, for example, real-time communications traffic such as Voice-over-IP (VoIP) or video meetings, the corresponding user cannot continue to wait until the channel state becomes better. For the users receiving real-time communications traffic service, it is necessary to transmit data to the corresponding users even in the bad channel state in order to guarantee a minimum amount of delay.

Second, the diversity technology will be described.

As described above, the AMC technology is not appropriate for delay-sensitive communications traffic, such as real-time communications traffic that should not be adapted to the channel environment of a specific user, like the broadcast channel and common control channel. However, diversity technology is one of the communication technologies suitable for the transmission of the delay-sensitive communications traffic or communications traffic shared by a plurality of users.

Generally, an amount a wireless channel suffers from a poor channel environment changes in the time domain. Even in the frequency domain, the wireless channel has a good state in one band and a bad state in another band on a repeated basis. In this channel environment, when data transmission cannot be adapted to the channel for a certain user, each terminal receiving the transmitted data inevitably faces the phenomenon in which it sometimes receives the data in a good channel state and sometimes receives the data in a bad channel state. The diversity technology is appropriate for such wireless environments or communications traffic. Therefore, diversity technology aims at allowing the transmission communications traffic to uniformly experience good channels and bad channels, if possible, for the following reasons. If a terminal receives a specific packet in a bad channel state, it will have difficulty in successfully decoding the received packet. In terms of the reception performance, however, if modulation symbols included in one packet include some symbols experiencing bad channels and other symbols experiencing good channels, the terminal can perform packet demodulation using the symbols experiencing the good channels.

Figure 2:
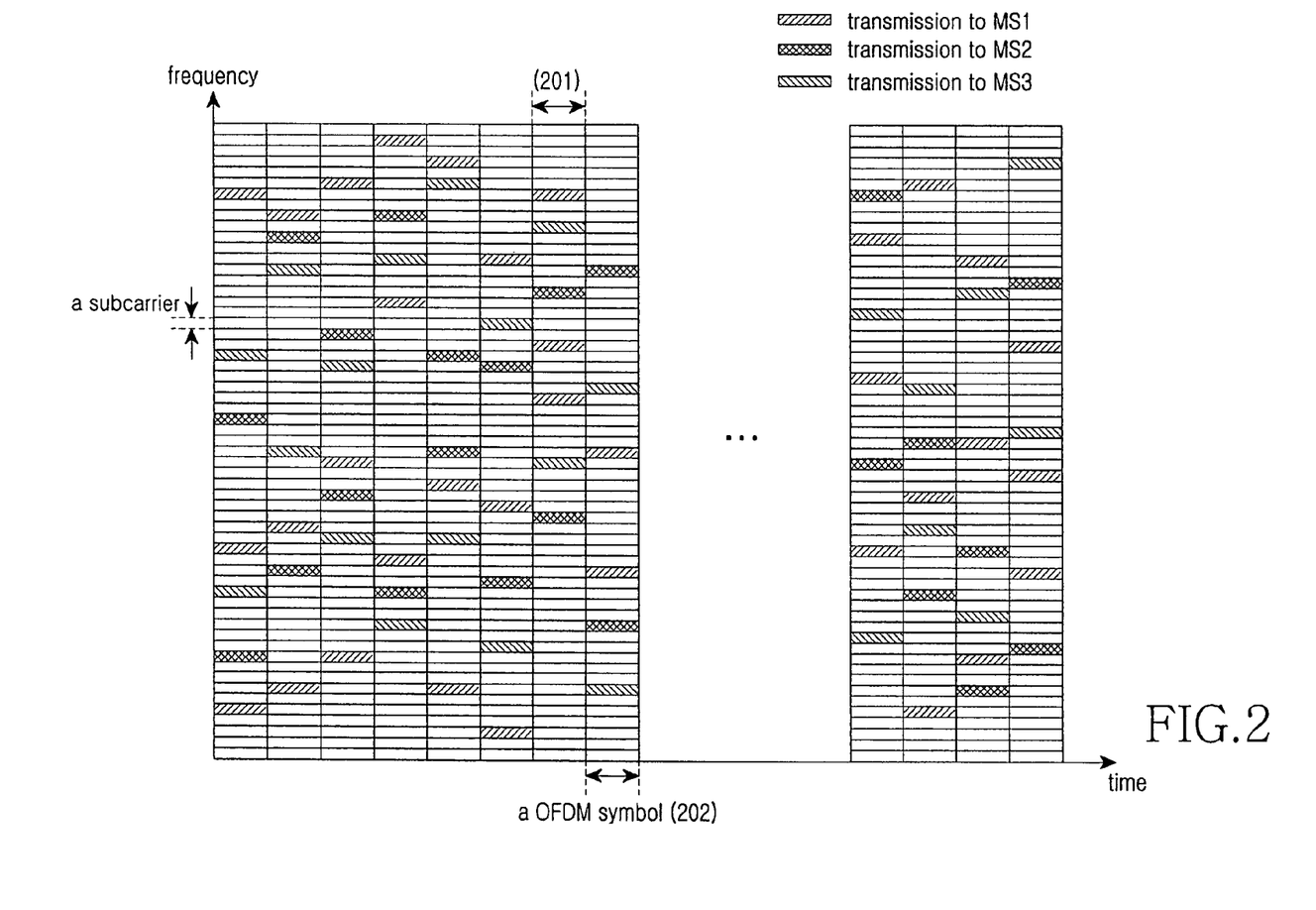
FIG. 2 is a diagram illustrating an exemplary method for transmitting user data or common control information using the diversity technology in the conventional OFDM system.

FIG. 2 is a diagram illustrating an exemplary method for transmitting user data or common control information using the diversity technology in the conventional OFDM system.

It is assumed in FIG. 2 that downlink data is being transmitted from a base station to three different mobile stations MS1, MS2 and MS3. It can be understood from FIG. 2 that when data is transmitted with the diversity technology, data transmitted to one user is spread over the frequency domain and the time domain. More specifically, data symbols for MS1 transmitted for an OFDM symbol interval denoted by reference numeral 201 occupy three sub-carriers. Typically, it is important that their positions spread over the full band in order to obtain diversity in the frequency domain, and that the specific positions are predefined between the base station and the terminals.

In addition, it can be noted that the symbols transmitted to the MS1 for the OFDM symbol interval 201 are different in position from the symbols transmitted to the MS1 for the OFDM symbol interval denoted by reference numeral 202. This is to change the sub-carriers through which data symbols will be transmitted, for every OFDM symbol or every predetermined transmission unit, in order to maximize the diversity effect in the time domain. This technique is called "frequency hopping," and most OFDM systems employing diversity technology use a frequency hopping technique.

As described above, the AMC and diversity technologies, used to overcome the fading phenomenon in the OFDM system, are opposite to each other not only in their characteristics, but also in their appropriate communications traffic types. Accordingly, there is a need to operate a communications system such that it appropriately combines the two technologies, rather than using only one of the technologies.

SUMMARY OF THE INVENTION

Exemplary embodiments of the present invention address at least the above problems and/or disadvantages and provide at least the advantages described below. Accordingly, an aspect of the present invention is to provide a transmission/reception apparatus capable of efficiently using a diversity technology and an AMC technology together in a communication system supporting high-speed wireless multimedia service, and a method for operating the same.

The exemplary embodiments of the present invention also provides a method for configuring an adaptive channel in a communication system supporting high-speed wireless multimedia service, and a system for transmitting/receiving data using the method.

According to one aspect of an exemplary embodiment of the present invention, there is provided a method for configuring and managing a channel in a wireless communication system that divides a full frequency band into a plurality of sub-bands. The method comprises the steps of selecting at least one sub-band from the plurality of sub-bands and allocating each of a plurality of Adaptive Modulation and Coding (AMC) channels using the selected at least one sub-band; puncturing sub-carriers of at least one of the plurality of AMC channels according to a predetermined pattern; and allocating a diversity channel using the punctured sub-carriers.

According to another aspect of an exemplary embodiment of the present invention, there is provided a method for transmitting a channel by a base station in a wireless communication system that divides a full frequency band into a plurality of sub-bands. The method comprises the steps of determining sub-carriers allocated to a diversity channel among sub-carriers of the plurality of sub-bands; determining sub-carriers allocated to a plurality of Adaptive Modulation and Coding (AMC) channels such that each of the AMC channel includes at least one of the plurality of sub-bands and excludes the sub-carriers allocated to the diversity channel; determining a modulation scheme and a coding scheme for each of the AMC channels using channel quality information (CQI) of a downlink received from each terminal; and transmitting the AMC channels and the diversity channel together.

According to further another aspect of an exemplary embodiment of the present invention, there is provided a transmission apparatus of a base station in a wireless communication system that divides a full frequency band into a plurality of sub-bands. The apparatus comprises a diversity channel allocator for selecting predetermined sub-carriers from sub-carriers of the plurality of sub-bands, and allocating a diversity channel using the selected sub-carriers; an Adaptive Modulation and Coding (AMC) channel allocator for allocating a plurality of AMC channels such that each of the AMC channels includes at least one sub-band among the plurality of sub-bands; a controller for controlling the AMC channel allocator such that the AMC channel allocator determines sub-carriers allocated to the plurality of AMC channels except for the sub-carriers allocated to the diversity channel; means for determining a modulation scheme and a coding scheme for each of the AMC channels using channel quality information (CQI) of a downlink received from each terminal; and a transmitter for transmitting the AMC channels and the diversity channel together.

According to yet another aspect of an exemplary embodiment of the present invention, there is provided a method for receiving a channel by a terminal in a wireless communication system that divides a full frequency band into a plurality of sub-bands. The method comprises the steps of measuring channel quality of a downlink according to a predetermined rule to generate channel quality information (CQI) and transmitting the CQI to a base station; receiving control information for separately demodulating each channel from a control channel in a wireless environment where the base station transmits a diversity channel and an Adaptive Modulation and Coding (AMC) channel together; determining based on the received control information whether to receive the diversity channel or the AMC channel; and if it is determined to receive the diversity channel or the AMC channel, demodulating the diversity channel or the AMC channel according to a modulation scheme and a coding scheme defined in the control information.

According to still another aspect of an exemplary embodiment of the present invention, there is provided a reception apparatus of a terminal in a wireless communication system that divides a full frequency band into a plurality of sub-bands. The apparatus comprises channel quality information (CQI) transmission means for measuring channel quality of a downlink according to a predetermined rule to generate CQI, and transmitting the CQI to a base station; control channel demodulation means for receiving control information for separately demodulating each channel from a control channel in a wireless environment where the base station transmits a diversity channel and an Adaptive Modulation and Coding (AMC) channel together; and data channel demodulation means for, if there is a need to receive the diversity channel or the AMC channel, demodulating the diversity channel or the AMC channel according to a modulation scheme and a coding scheme defined in the received control information.

According to still another aspect of an exemplary embodiment of the present invention, there is provided an apparatus for configuring and managing a channel in a base station of a wireless communication system that divides a full frequency band into a plurality of sub-bands. The apparatus comprises selecting means for selecting at least one sub-band from the plurality of sub-bands and allocating each of a plurality of Adaptive Modulation and Coding (AMC) channels using the selected at least one sub-band; controlling means for puncturing sub-carriers of at least one of the plurality of AMC channels according to a predetermined pattern; and channel allocating means for allocating a diversity channel using the punctured sub-carriers.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Although the term "AMC technology" will be used in the following description to keep the consistency with the foregoing description, it should be noted that a name of the channels described with reference to the following drawings is not restricted to the AMC channel, but may change to another equivalent name, for example, a frequency scheduling channel or a localized sub-carrier channel. In addition, although an OFDM system will be used herein as the communication system to which exemplary embodiments of the present invention are applied, the exemplary embodiments of the present invention can be applied not only to the OFDM system, but also to every kind of communication system that divides the full frequency band into a plurality of sub-bands and can use both the AMC technology and the diversity technology.

Figure 3:
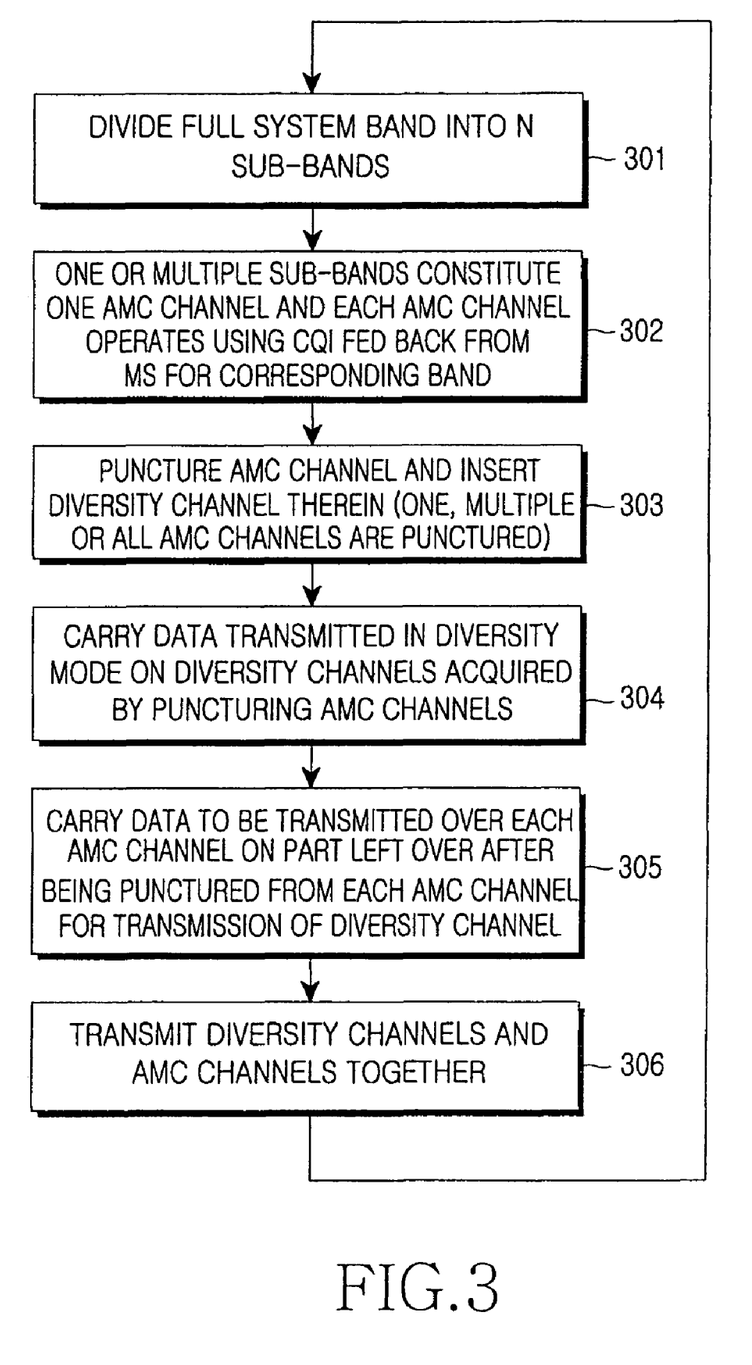
FIG. 3 is a flowchart illustrating a method for simultaneously managing a diversity technology and an AMC technology according to an exemplary embodiment of the present invention.

FIG. 3 is a flowchart illustrating a method for simultaneously managing a diversity technology and an AMC technology according to an exemplary embodiment of the present invention.

The system according to an exemplary embodiment of the present invention divides the full system band into N sub-bands in step 301. Each sub-band includes one or a plurality of OFDM symbols in the time axis. A description thereof will be given below with reference to FIG. 4.

Figure 4:
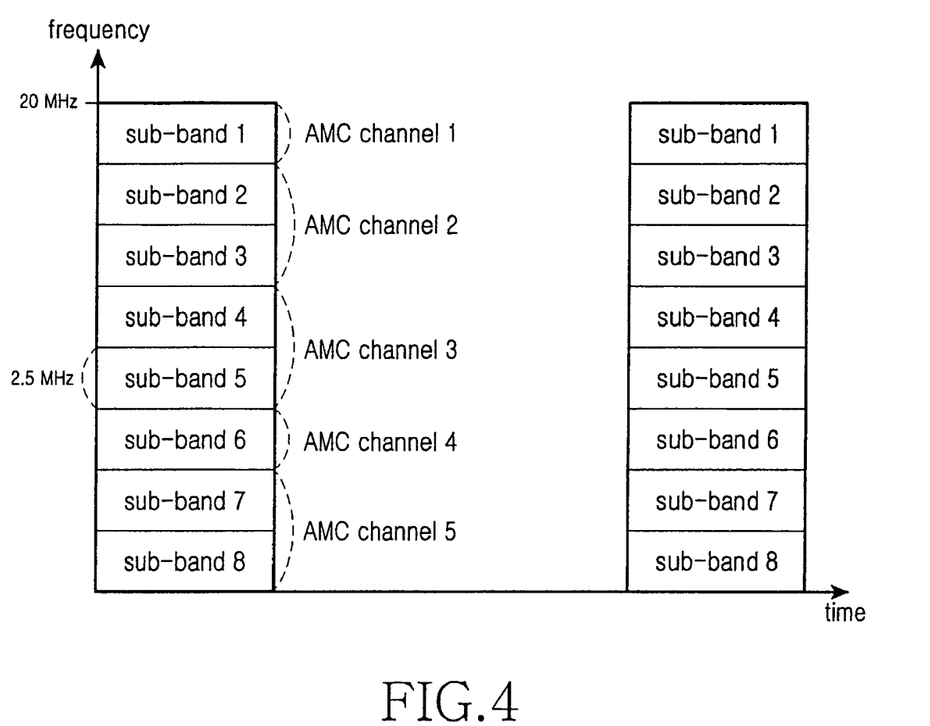
FIG. 4 is a flowchart illustrating an method for dividing the full system band into N sub-bands according to an exemplary embodiment of the present invention.

FIG. 4 is a flowchart illustrating an exemplary method for dividing the full system band into N sub-bands according to an exemplary embodiment of the present invention.

It is assumed in FIG. 4 that the full system band is 20 MHz and the number of sub-bands is N=8. The full system band is divided into eight 2.5-MHz sub-bands as illustrated in FIG. 4. Each of the sub-bands is the minimum constituent unit of an AMC channel for an AMC operation. Therefore, in the system according to an exemplary embodiment of the present invention, one or a plurality of (or all) sub-bands constitute one AMC channel and each AMC channel operates depending on CQI of a corresponding band that is fed back from a terminal, in step 302. Referring to FIG. 4, 8 sub-bands constitute 5 AMC channels #1 to #5 in step 301. The 5 AMC channels each operate depending on received CQI thereof.

In step 303, the system according to the present invention generates one or a plurality of diversity channels by puncturing the AMC channels. In this case, to transmit one diversity channel, one of a plurality or all of the AMC channels are punctured. In step 304, the system allocates data symbols transmitted in a diversity mode to the diversity channels obtained by puncturing the AMC channels in step 303. Thereafter, in step 305, the system allocates data symbols to be transmitted on each AMC channel to the sub-carriers left over after being punctured for transmission of the diversity channels in each AMC channel. After loading data in this method, the system transmits the configured at least one diversity channel and at least one AMC channel as one OFDM symbol in step 306.

The operation in steps 301 to 306 for configuring at least one diversity channel and at least one AMC channel into one OFDM symbol is repeated every predetermined scheduling period. Herein, the operation in steps 301 and 302 may be omitted without the necessity of being repeated every scheduling period.

In an exemplary embodiment of the present invention, the number of AMC channels to which the diversity channel is allocated is inversely proportional to the number of terminals receiving the diversity channel. An increase in the number of AMC channels to which the diversity channel is allocated causes an increase in the number of sub-carriers punctured in the corresponding AMC channel. That is, if the number of users of the diversity channel is smaller, the diversity channel is configured by puncturing a small number of sub-carriers in each of the AMC channels. If the number of users of the diversity channel is greater, the diversity channel is configured by puncturing a large number of sub-carriers in each of the AMC channels. It is also possible to separately designate sub-bands for the diversity channel.

Figure 5:
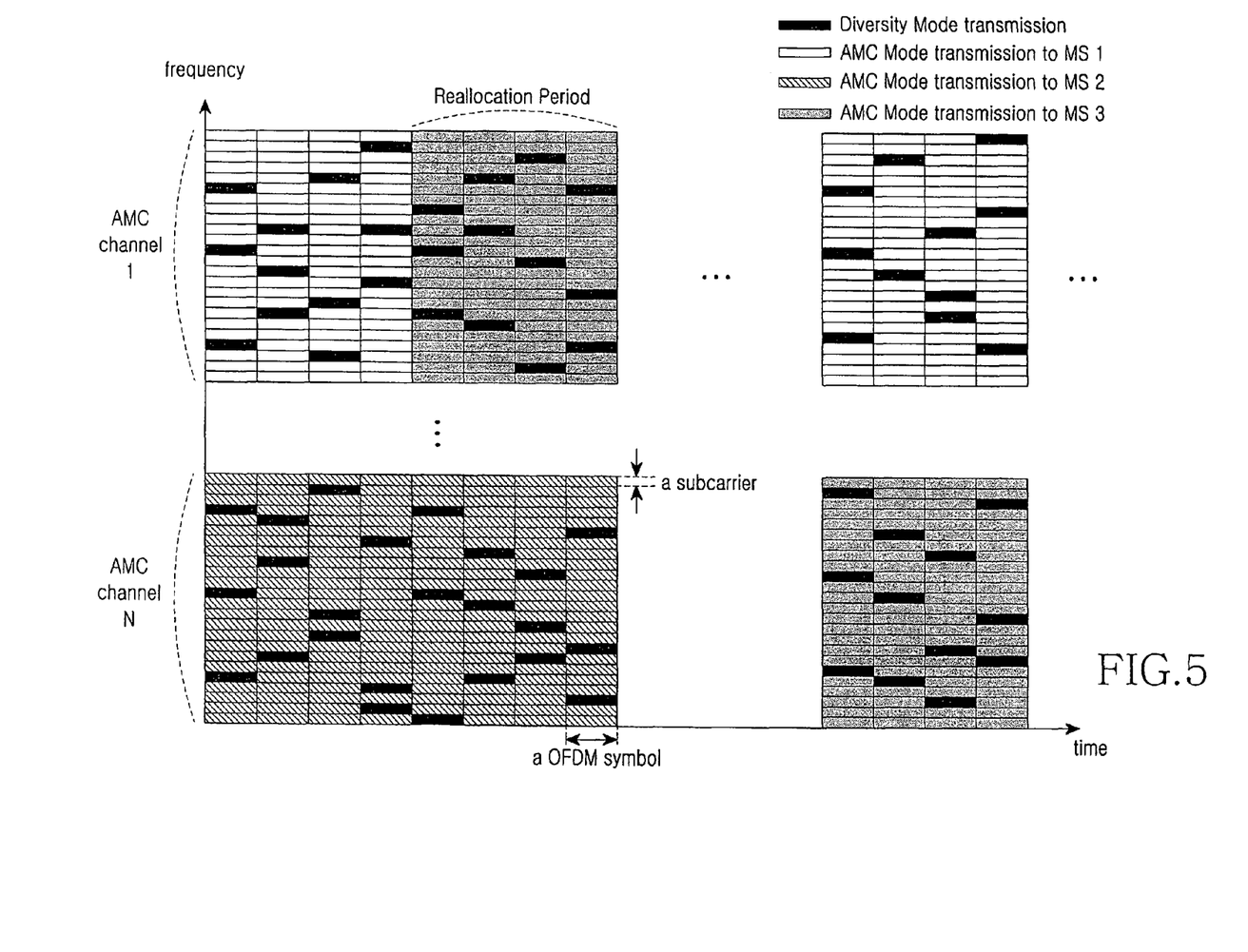
FIG. 5 is a diagram illustrating an method for transmitting diversity channels and AMC channels together according to an exemplary embodiment of the present invention.

FIG. 5 is a diagram illustrating an exemplary method for transmitting diversity channels and AMC channels together according to an exemplary embodiment of the present invention.

It can be noted from FIG. 5 that N AMC channels are transmitted and diversity channels are transmitted using the channels formed by puncturing the AMC channels. As illustrated in FIG. 5, it can also be noted that transmission positions of the diversity channels, i.e., sub-carrier positions mapped to the data symbols transmitted in a diversity mode, are hopping every OFDM symbol. In addition, it can also be noted that data symbols for 3 terminals MS1, MS2 and MS3 are transmitted over their associated predetermined AMC channels. Although only the time axis and the frequency axis are exemplified in FIG. 5, it should be noted that the technology proposed in the exemplary embodiment of the present invention for transmitting diversity channels configured by puncturing AMC channels can also be applied to any system that spreads and transmits one modulation symbol over a plurality of sub-carriers in the frequency axis.

Figure 6:
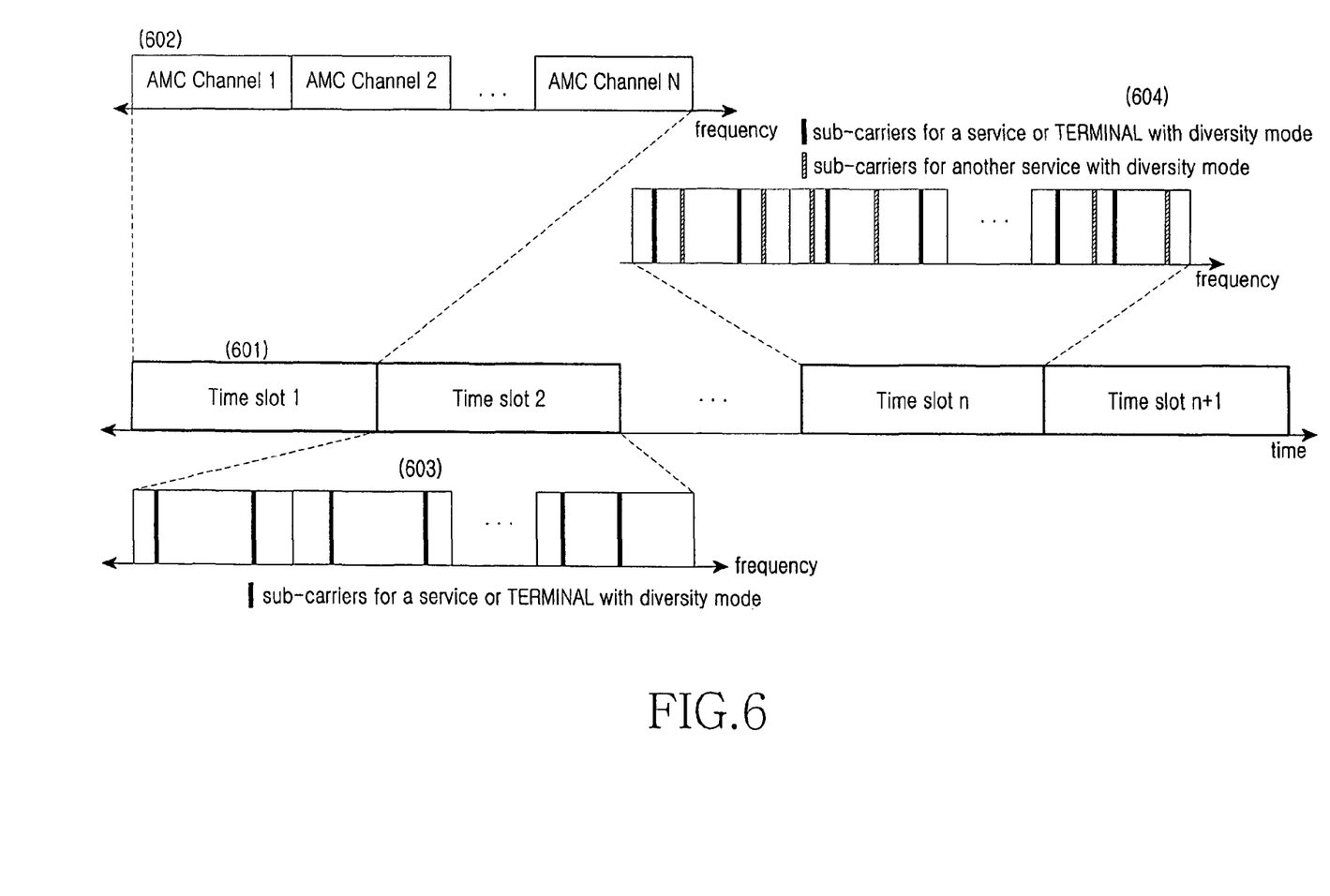
FIG. 6 is a diagram illustrating an method for allocating sub-carriers in a time slot when diversity channels and AMC channels are managed together according to an exemplary embodiment of the present invention.

FIG. 6 is a diagram illustrating an exemplary method for allocating sub-carriers in a time slot when diversity channels and AMC channels are managed together according to an exemplary embodiment of the present invention. Referring to FIG. 6, the term "time slot" refers to a transmission unit or scheduling unit of one information block. In FIG. 6, OFDM symbols transmitted for a time slot #1, a time #2, . . . , a time slot #n, as observed in the frequency domain, are denoted by reference numerals 602, 603 and 604. As shown by reference numeral 602, there are N AMC channels in one time slot. All of the sub-carriers are divided by N sub-bands and one AMC band consists of one or multiple sub-MC bands. For an example of the proposed scheme, during the very first slot 601 all of the sub-carriers are used in an AMC channel without any diversity channel, as shown in 602. Reference numeral 603 shows an example in which a part of the sub-carriers to be transmitted to services or terminals in the diversity mode are punctured according to a predetermined puncturing pattern. The puncturing pattern can be updated every slot or every OFDM symbol according to a predetermined hopping rule. The sub-carriers that are left after being punctured are used for transmission in the AMC mode, and there is no difference between the AMC mode transmission and the general AMC mode transmission except for a decrease in the number of available sub-carriers. In addition, information on the sub-carriers used in the diversity mode can be delivered to the terminals over a control channel. Meanwhile, reference numeral 604 shows an example in which sub-carriers are transmitted in the diversity mode from a viewpoint of a particular terminal or service. In the example shown in 604 the numbers of sub-carriers used for diversity mode is increased compared to the example shown in 603.

Figure 7:
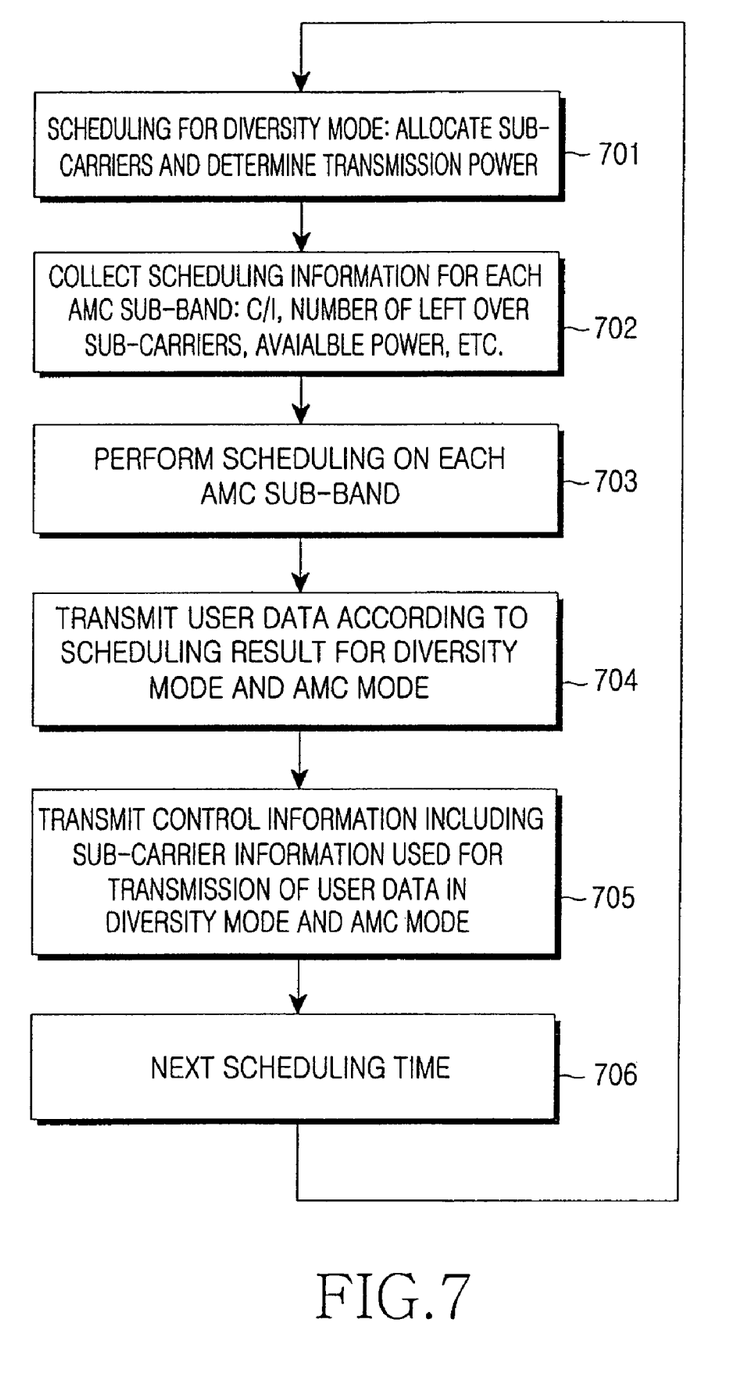
FIG. 7 is a flowchart illustrating a scheduling operation of a base station according to an exemplary embodiment of the present invention.

FIG. 7 is a flowchart illustrating a scheduling operation of a base station according to an exemplary embodiment of the present invention.

Referring to FIG. 7, a base station according to an exemplary embodiment of the present invention performs scheduling for the diversity mode in step 701. That is, the base station determines which data symbols should be transmitted over diversity channels, and how many sub-carriers are needed for the transmission of the data symbols. Further, the base station determines how many sub-carriers should be punctured in AMC channels according to the determination, and then determines their puncturing positions according to a predetermined rule. Moreover, in step 701, the base station configures diversity channels, and then determines transmission power of the diversity channels.

Thereafter, in step 702, the base station collects scheduling information for at least one sub-band constituting each AMC channel. For example, the base station configures CQI information for each AMC channel fed back from terminals, and the diversity channels determined in step 701. The base station then collects the scheduling information, such as the number of the remaining sub-carriers and available power for each individual AMC channel. Thereafter, in step 703, the base station performs scheduling on at least one sub-band constituting each AMC channel. The scheduling process can select the terminal having the best channel quality for each AMC channel, or can take into this into account together with the amount of data to be transmitted to each terminal.

In step 704, the base station configures OFDM symbols including user data according to the scheduling result for the diversion mode and the AMC mode, and transmits the configured OFDM symbols to a wireless network. In step 705, the base station transmits diversity channels and AMC channels in which the OFDM symbols are transmitted, together with control information including sub-carrier information needed by the terminals for receiving the diversity channels and AMC channels. Herein, the control information includes sub-carrier positions of the diversity channels and sub-carrier transmission positions of the AMC channels configured using the sub-carriers left after configuring the diversity channels. Thereafter, in step 706, the base station repeats the operation in steps 701 to 705 for the next scheduling, every predetermined scheduling period.

Figure 8:
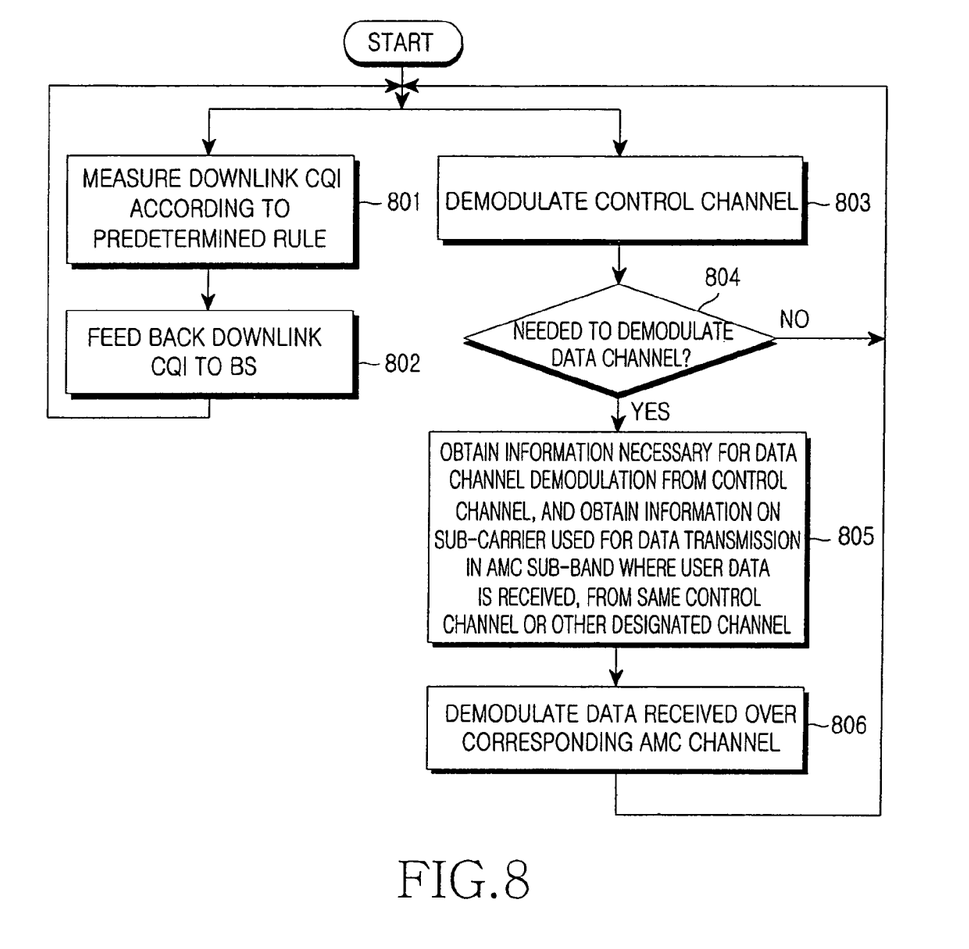
FIG. 8 is a flowchart illustrating a terminal's operation of receiving data from AMC channels according to an exemplary embodiment of the present invention.

FIG. 8 is a flowchart illustrating a terminal's operation of receiving data from AMC channels according to an exemplary embodiment of the present invention. Referring to FIG. 8, an operation of the terminal includes a first loop of steps 801 and 802, and a second loop of steps 803 to 806.

The first loop corresponds to an operation in which the terminal feeds back CQI information to a base station. The terminal measures CQI of a downlink according to a predetermined rule in step 801, and then feeds back the measured CQI information to the base station in step 802.

In the second loop corresponding to an operation in steps 803 to 806, the terminal receives AMC channels. The terminal demodulates a control channel transmitted by the base station in step 803. After demodulating the control channel, the terminal determines in step 804 whether there is a need to demodulate AMC channels. That is, the terminal determines whether the base station has transmitted data to the corresponding terminal for this data transmission interval. If it is determined that there is no data transmitted to the corresponding terminal, the terminal goes to the next data transmission interval. However, if it is determined in step 804 that there is data transmitted to the corresponding terminal, i.e., there is a need for demodulation of a data channel, then the terminal obtains control information necessary for data channel demodulation from the control channel in step 805. The control information includes information necessary for reception of AMC channels, for example, it includes sub-carrier location information of the AMC channels so that the terminal may determine a position of the sub-carriers left after puncturing the sub-carriers for configuration of diversity channels. The control information can be transmitted not only over the control channel, but also over the other designated channels. After acquiring the control information necessary for demodulating the AMC channels, the terminal demodulates data received over the corresponding AMC channel using the acquired control information in step 806. The process of steps 803 to 806 is repeated when the terminal continues to receive data. An embodiment of FIG. 8 is useful for the transmission of data for a particular user.

Figure 9:
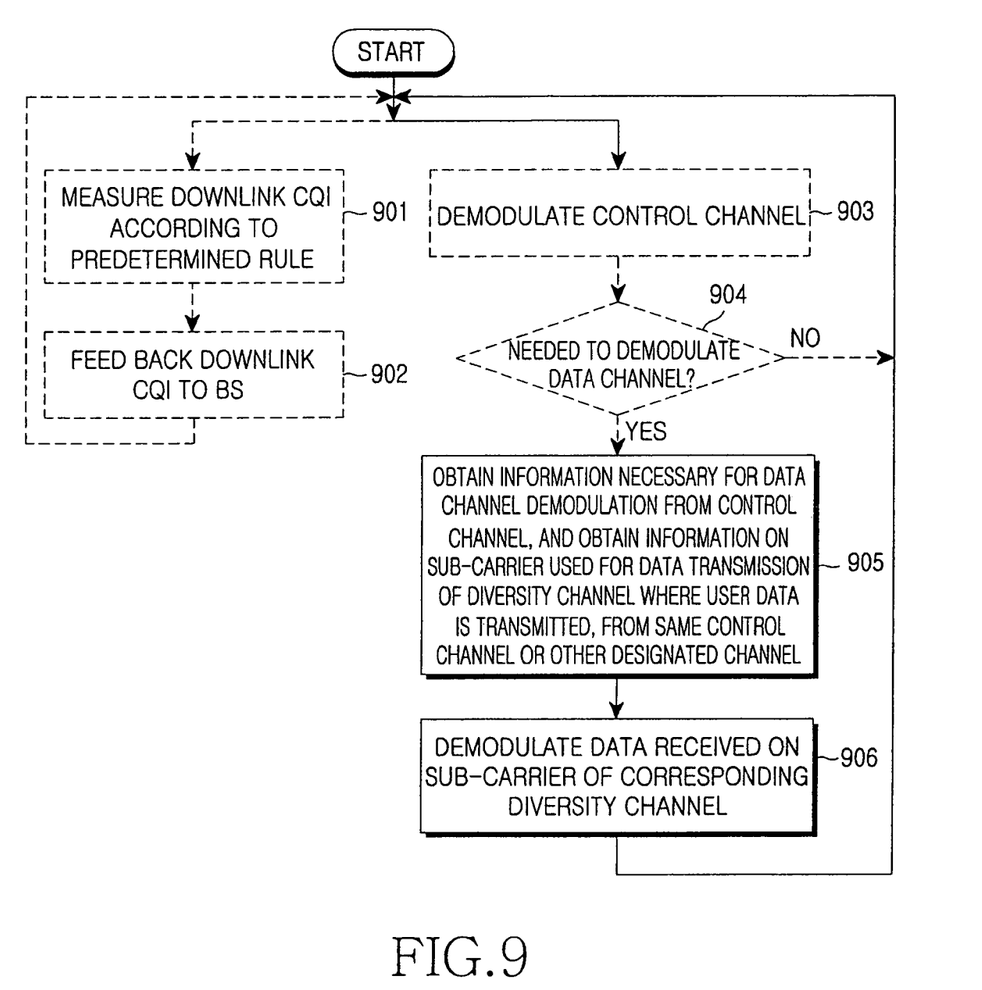
FIG. 9 is a flowchart illustrating a terminal's operation of receiving data from diversity channels according to an exemplary embodiment of the present invention.

FIG. 9 is a flowchart illustrating a terminal's operation of receiving data from diversity channels according to an exemplary embodiment of the present invention.

Similarly, in FIG. 9, an operation of the terminal includes a first loop of steps 901 and 902, and a second loop of steps 903 to 906. The steps denoted by a dotted line in FIG. 9 can be omitted.

The first loop corresponds to an operation in which the terminal feeds back CQI information to a base station. The terminal measures CQI of a downlink according to a predetermined rule in step 901, and then feeds back the measured CQI information to the base station in step 902. In the second loop corresponding to an operation in steps 903 to 906, the terminal receives diversity channels. The terminal demodulates a control channel transmitted by the base station in step 903. After demodulating the control channel, the terminal determines in step 904 whether there is a need to demodulate diversity channels. That is, the terminal determines whether the base station has transmitted data to the corresponding terminal for this data transmission interval.

If it is determined in step 904 that there is no data transmitted to the corresponding terminal, the terminal goes to the next data transmission interval. However, if it is determined in step 904 that there is data transmitted to the corresponding terminal, the terminal obtains control information necessary for demodulation of diversity channels from the control channel in step 905. The control information includes information necessary for the reception of AMC channels, for example, it includes location information of sub-carriers constituting the diversity channels. The control information can be transmitted not only over the control channel, but also over the other designated channels. After acquiring the control information necessary for demodulating the diversity channels, the terminal demodulates data received over the corresponding diversity channel using the acquired control information in step 906. The process of steps 903 to 906 is repeated when the terminal continues to receive data. In the diversity channel reception process, the operation in steps 903 and 904 can be omitted in the case where the terminal and the base station previously agreed to receive terminal data in a specific sub-carrier position. In other words, the operation can be omitted in the case where the terminal agreed with the base station to continuously transmit data for a predetermined time without determining every time whether to transmit diversity channels for the terminal itself. An embodiment of FIG. 9 is useful for the case where a predetermined amount of data, like the real-time traffic, should be continuously transmitted.

Figure 10:
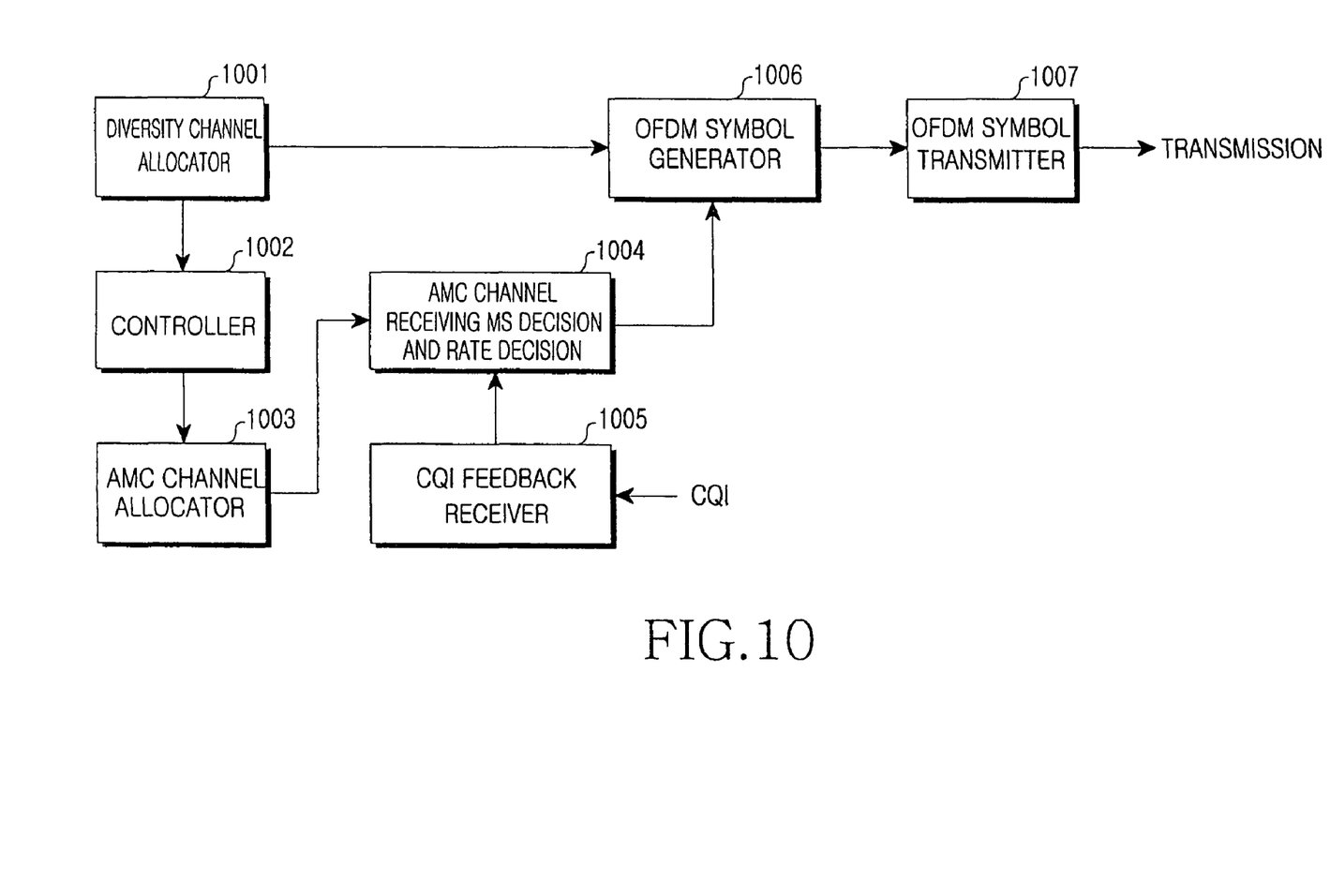
FIG. 10 is a block diagram illustrating a structure of a base station's transmitter according to an exemplary embodiment of the present invention.

FIG. 10 is a block diagram illustrating a structure of a base station's transmitter according to an exemplary embodiment of the present invention.

Referring to FIG. 10, a diversity channel allocator 1101 determines through which sub-carriers in the full system band it will transmit diversity channels, i.e., determines with which sub-carriers it will configure diversity channels. An AMC channel allocator 1103 determines through which sub-carriers in the full system band it will transmit AMC channels, i.e., determines with which sub-carriers it will configure AMC channels. A controller 1002 receives, from the diversity channel allocator 1001, information indicting to which sub-carriers the diversity channels are allocated, and based on the received information, controls the AMC channel allocator 1003 such that it configures AMC channels. That is, the controller 1002 controls the AMC channel allocator 1003 such that it can transmit AMC channels on the remaining sub-carriers except for the sub-carriers used by the diversity channels. Referring to FIG. 10, the AMC channel allocator 1003, under the control of the controller 1002, determines sub-carriers through which AMC channels will be transmitted.

A channel quality feedback receiver 1005 receives CQI information of a downlink from each terminal. An AMC channel receiving terminal decision and rate decision unit 1004 receives CQI information transmitted by each terminal, from the channel quality feedback receiver 1005. Further the AMC channel receiving terminal decision and rate decision unit 1004 receives information on the number of sub-carriers used for each AMC channel from the AMC channel allocator 1003. Based on the received information, the AMC channel receiving terminal decision and rate decision unit 1004 determines to which user it will allocate each AMC channel and which data rate it will use. An OFDM symbol generator 1006 receives configuration information for the diversity channels and the AMC channels from the diversity channel allocator 1001 and the AMC channel receiving terminal decision and rate decision unit 1004, and configures one OFDM symbol based on the received configuration information. The process of configuring data channels using both the AMC channels and the diversity channels can be performed through the methods of FIGS. 4 through 6. Finally, the OFDM symbol transmitter 1007 transmits the OFDM symbol generated by the OFDM symbol generator 1006 to a wireless network.

Figure 11:
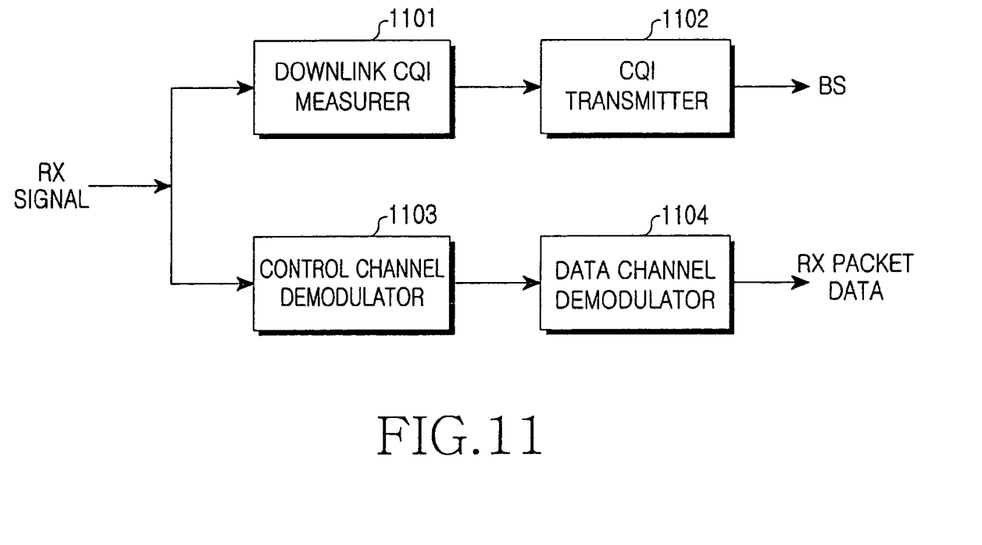
FIG. 11 is a block diagram illustrating a structure of a terminal's receiver according to an exemplary embodiment of the present invention.

FIG. 11 is a block diagram illustrating a structure of a terminal's receiver according to an exemplary embodiment of the present invention. Referring to FIG. 11, a downlink channel quality measurer 1101 measures CQI of a downlink channel every predetermined period, and outputs the measured CQI to a CQI transmitter 1102. The CQI transmitter 1102 transmits the received CQI information to a transmitter after a specific channel coding process. In a data receiving operation, a control channel demodulator 1103 receives a control channel including therein control information for reception of diversity channels and/or AMC channels from the downlink. A data channel demodulator 1104 demodulates data channels based on the control information received from the control channel demodulator 1103, and outputs the demodulated data. The demodulated data is the packet transmitted through the diversity mode or the AMC mode.

As can be understood from the foregoing description, the proposed method of efficiently combining and managing the diversity technique and the AMC technique can optimize performance of each channel, i.e., each of the diversity channels and the AMC channels. That is, the proposed method configures the diversity channels such that they maximally spread in the time axis and the frequency axis, and configures the AMC channels such that they use all of the remaining sub-carriers except for the sub-carriers used by the diversity channels. Further, the sub-carriers are adjacent to each other thereby increasing AMC transmission efficiency. Therefore, exemplary embodiments of the present invention contribute to capacity maximization of a communication system that transmits/receives data using an OFDM-based multiple access scheme.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for configuring and managing a wireless communication system having a frequency band, the method comprising:
dividing the frequency band into a plurality of sub-bands, each sub-band comprising a plurality of sub-carriers;
operating a plurality of Adaptive Modulation and Coding (AMC) channels such that each AMC channel constitutes one or more sub-bands of the plurality of sub-bands;
puncturing the sub-carriers of at least one of the plurality of AMC channels according to a predetermined pattern resulting in a plurality of punctured sub-carriers; and
allocating one or more of the plurality of punctured sub-carriers to a diversity channel.

2. The method of claim 1, further comprising transmitting the plurality of AMC channels and the diversity channel together in one time slot.

3. The method of claim 1, wherein the wireless communication system is an orthogonal frequency division multiplexing (OFDM) system, and the method further comprises transmitting the plurality of AMC channels and the diversity channel together in one OFDM symbol interval.

4. The method of claim 1, further comprising the step of allocating a control channel for transmitting information on each of the sub-carriers constituting the diversity channel.

5. The method of claim 1, wherein the number of the plurality of AMC channels to which the diversity channel is allocated is inversely proportional to the number of terminals receiving the diversity channel.

6. The method of claim 5, wherein an increase in the number of the plurality of AMC channels to which the diversity channel is allocated causes a decrease in the number of sub-carriers punctured in each of the plurality of AMC channels.

7. A method for transmitting by a base station in a wireless communication system having a full frequency band comprising a plurality of sub-bands, each sub-band comprising a plurality of sub-carriers, the method comprising the steps of:
determining sub-carriers allocated to a diversity channel among sub-carriers of the plurality of sub-bands;
determining sub-carriers allocated to a plurality of Adaptive Modulation and Coding (AMC) channels such that each of the AMC channel includes at least one of the plurality of sub-bands and excludes the sub-carriers allocated to the diversity channel;
determining a modulation scheme and a coding scheme for each of the AMC channels using channel quality information (CQI) of a downlink received from each terminal; and
transmitting the AMC channels and the diversity channel together.

8. The method of claim 7, wherein the AMC channels and the diversity channel are transmitted together in one time slot.

9. The method of claim 7, wherein the wireless communication system is an orthogonal frequency division multiplexing (OFDM) system, and the AMC channels and the diversity channel are transmitted together in one OFDM symbol interval.

10. The method of claim 7, further comprising the step of transmitting information on each of the sub-carriers constituting the diversity channel through a control channel.

11. The method of claim 7, wherein the number of the AMC channels to which the diversity channel is allocated is inversely proportional to the number of terminals receiving the diversity channel.

12. The method of claim 11, wherein an increase in the number of the AMC channels to which the diversity channel is allocated causes a decrease in the number of sub-carriers punctured in each AMC channel.

13. A transmission apparatus of a base station in a wireless communication system that divides a full frequency band into a plurality of sub-bands, each sub-band comprising a plurality of sub-carriers, the apparatus comprising:
 a diversity channel allocator for selecting predetermined sub-carriers from sub-carriers of the plurality of sub-bands, and allocating a diversity channel using the selected sub-carriers;
 an Adaptive Modulation and Coding (AMC) channel allocator for allocating a plurality of AMC channels such that each of the AMC channels includes at least one sub-band among the plurality of sub-bands;
 a controller for controlling the AMC channel allocator such that the AMC channel allocator determines sub-carriers allocated to the plurality of AMC channels except for the sub-carriers allocated to the diversity channel;
 means for determining a modulation scheme and a coding scheme for each of the AMC channels using channel quality information (CQI) of a downlink received from each terminal; and
 a transmitter for transmitting the AMC channels and the diversity channel together.

14. The transmission apparatus of claim 13, wherein the transmitter transmits the AMC channels and the diversity channel together in one time slot.

15. The transmission apparatus of claim 13, wherein the wireless communication system is an orthogonal frequency division multiplexing (OFDM) system, and the transmitter transmits the AMC channels and the diversity channel together in one OFDM symbol interval.

16. The transmission apparatus of claim 13, further comprising means for transmitting information on each of the sub-carriers constituting the diversity channel through a control channel.

17. The transmission apparatus of claim 13, wherein the number of the AMC channels to which the diversity channel is allocated is inversely proportional to the number of terminals receiving the diversity channel.

18. The transmission apparatus of claim 17, wherein an increase in the number of the AMC channels to which the diversity channel is allocated causes a decrease in the number of sub-carriers punctured in each AMC channel.

19. A method for receiving a channel by a terminal in a wireless communication system comprising a full frequency band having a plurality of sub-bands, each sub-band comprising a plurality of sub-carriers, the method comprising the steps of:
 measuring channel quality of a downlink according to a predetermined rule to generate channel quality information (CQI) and transmitting the CQI to a base station;
 receiving control information for separately demodulating each channel from a control channel in a wireless environment where the base station transmits a diversity channel and an Adaptive Modulation and Coding (AMC) channel together;
 determining, based on the received control information, whether to receive the diversity channel or the AMC channel; and
 if it is determined to receive the diversity channel or the AMC channel, demodulating the diversity channel or the AMC channel according to a modulation scheme and a coding scheme defined in the control information.

20. A reception apparatus of a terminal in a wireless communication system comprising a full frequency band having a plurality of sub-bands, each sub-band comprising a plurality of sub-carriers, the apparatus comprising:
 a channel quality information (CQI) transmitter for measuring channel quality of a downlink according to a predetermined rule to generate CQI, and transmitting the CQI to a base station;
 a control channel demodulator for receiving control information for separately demodulating each channel from a control channel in a wireless environment where the base station transmits a diversity channel and an Adaptive Modulation and Coding (AMC) channel together; and
 data channel demodulator for, if there is a need to receive the diversity channel or the AMC channel, demodulating the diversity channel or the AMC channel according to a modulation scheme and a coding scheme defined in the received control information.

21. An apparatus for configuring and managing a channel in a base station of a wireless communication system comprising a full frequency band having a plurality of sub-bands, each sub-band comprising a plurality of sub-carriers, the apparatus comprising:
 dividing means for dividing the frequency band into a plurality of sub-bands, each sub-band comprising a plurality of sub-carriers;
 operating means for operating a plurality of Adaptive Modulation and Coding (AMC) channels such that each AMC channel constitutes one or more sub-bands from the plurality of sub-bands;
 controlling means for puncturing the sub-carriers of at least one of the plurality of AMC channels according to a predetermined pattern resulting in a plurality of punctured sub-carriers; and
 channel allocating means for allocating one or more of the plurality of punctured sub-carriers to a diversity channel.

22. A transmission apparatus of a base station in a wireless communication system that divides a full frequency band into a plurality of sub-bands, each sub-band comprising a plurality of sub-carriers, the apparatus comprising:
 means for selecting predetermined sub-carriers from the plurality of sub-bands, and allocating a diversity channel using the selected sub-carriers;
 means for allocating a plurality of AMC channels such that each of the AMC channels includes at least one sub-band of the plurality of sub-bands;
 means for controlling the AMC channel allocating means such that the AMC channel allocating means determines sub-carriers allocated to the plurality of AMC channels except for the sub-carriers allocated to the diversity channel;
 means for determining a modulation scheme and a coding scheme for each of the AMC channels using channel quality information (CQI) of a downlink received from at least one terminal; and
 means for transmitting the AMC channels and the diversity channel together.

23. A reception apparatus of a terminal in a wireless communication system comprising a full frequency band having a plurality of sub-bands, each sub-band comprising a plurality of sub-carriers, the apparatus comprising:
   means for measuring channel quality of a downlink according to a predetermined rule to generate CQI, and transmitting the CQI to a base station;
   means for receiving control information for separately demodulating at least one channel from a control channel in a wireless environment in which a base station transmits a diversity channel and an Adaptive Modulation and Coding (AMC) channel together; and
   means for, if there is a need to receive the diversity channel or the AMC channel, demodulating the diversity channel or the AMC channel according to a modulation scheme and a coding scheme defined in the received control information.

24. A non-transitory computer-readable medium embodying instructions that, when executed by a processor, perform configuring and managing a wireless communication system having a frequency band, by steps comprising:
   dividing the frequency band into a plurality of sub-bands, each sub-band comprising a plurality of sub-carriers;
   operating a plurality of Adaptive Modulation and Coding (AMC) channels such that each AMC channel constitutes one or more sub-bands of the plurality of sub-bands;
   puncturing the sub-carriers of at least one of the plurality of AMC channels according to a predetermined pattern resulting in a plurality of punctured sub-carriers; and
   allocating one or more of the plurality of punctured sub-carriers to a diversity channel.

25. A non-transitory computer-readable medium embodying instructions that, when executed by a processor, perform transmitting by a base station in a wireless communication system having a full frequency band comprising a plurality of sub-bands, each sub-band comprising a plurality of sub-carriers, by steps comprising:
   determining sub-carriers allocated to a diversity channel among sub-carriers of the plurality of sub-bands;
   determining sub-carriers allocated to a plurality of Adaptive Modulation and Coding (AMC) channels such that each of the AMC channel includes at least one of the plurality of sub-bands and excludes the sub-carriers allocated to the diversity channel;
   determining a modulation scheme and a coding scheme for each of the AMC channels using channel quality information (CQI) of a downlink received from each terminal; and
   transmitting the AMC channels and the diversity channel together.

26. A non-transitory computer-readable medium embodying instructions that, when executed by a processor, perform receiving a channel by a terminal in a wireless communication system comprising a full frequency band having a plurality of sub-bands, each sub-band comprising a plurality of sub-carriers, by steps comprising:
   measuring channel quality of a downlink according to a predetermined rule to generate channel quality information (CQI) and transmitting the CQI to a base station;
   receiving control information for separately demodulating each channel from a control channel in a wireless environment where the base station transmits a diversity channel and an Adaptive Modulation and Coding (AMC) channel together;
   determining, based on the received control information, whether to receive the diversity channel or the AMC channel; and
   if it is determined to receive the diversity channel or the AMC channel, demodulating the diversity channel or the AMC channel according to a modulation scheme and a coding scheme defined in the control information.

* * * * *